No. 696,857. Patented Apr. 1, 1902.
E. CLARKE.
COOKING STOVE OR RANGE.
(Application filed May 1, 1901.)
(No Model.) 2 Sheets—Sheet 1.
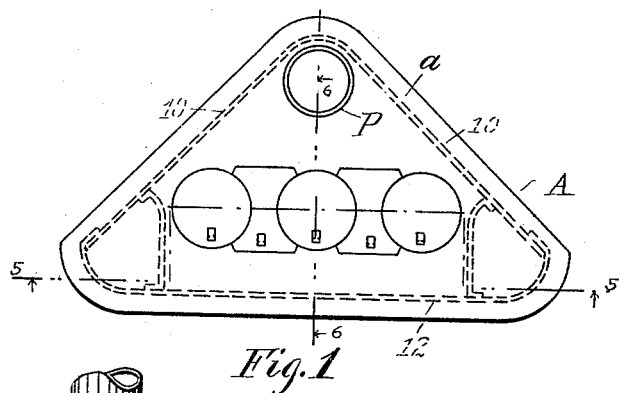
Fig. 1
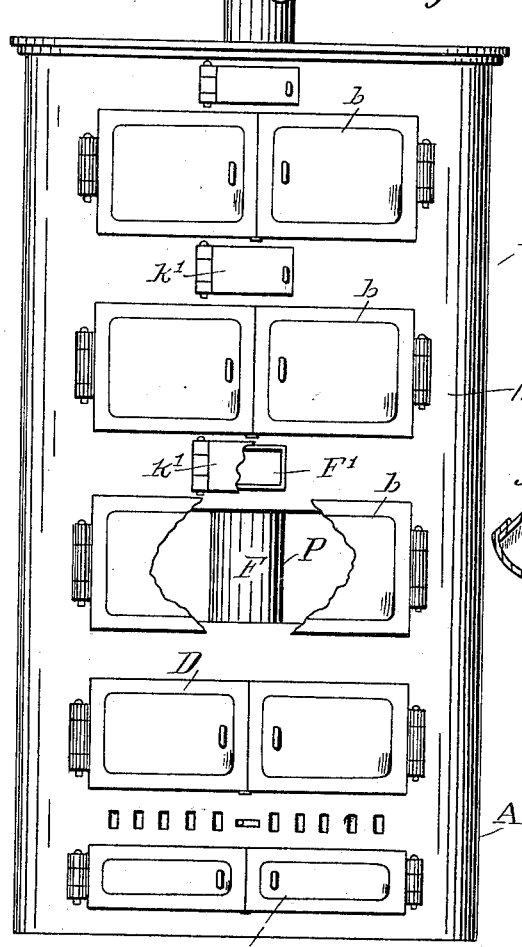
Fig. 2
Fig. 3
WITNESSES:
Emily H. Adams
Samuel H. Richardson.
INVENTOR
Eleanor Clarke
BY
ATTORNEY.

No. 696,857. Patented Apr. 1, 1902.
E. CLARKE.
COOKING STOVE OR RANGE.
(Application filed May 1, 1901.)
(No Model.) 2 Sheets—Sheet 2.
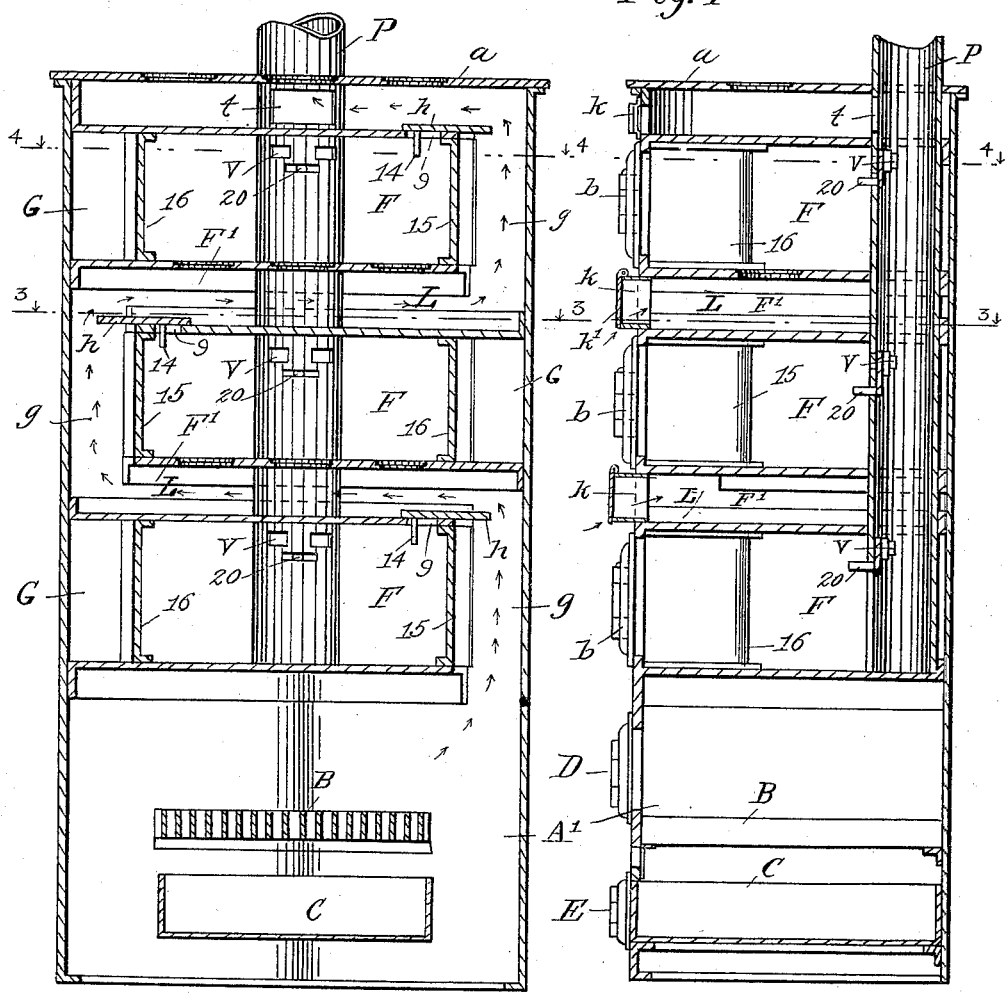

UNITED STATES PATENT OFFICE.

ELEANOR CLARKE, OF SEATTLE, WASHINGTON.

COOKING STOVE OR RANGE.

SPECIFICATION forming part of Letters Patent No. 696,857, dated April 1, 1902.

Application filed May 1, 1901. Serial No. 58,363. (No model.)

*To all whom it may concern:*

Be it known that I, ELEANOR CLARKE, a citizen of the United States, residing at Seattle, King county, Washington, have invented certain new and useful Improvements in Cooking Stoves or Ranges, of which the following is a specification.

My invention relates to improvements in stoves, and has special reference to an apparatus of this class adapted for both cooking and heating; and I have for the object thereof to provide a stove embodying extensive capacity for utensils in cooking, a graded radiation of heat throughout the plate-surfaces, and a body occupying comparatively small floor-space adapted for ventilation and to conduct away resultant steam and gases in cooking.

The above and other equally-desirable objects I attain by the construction, combinations, and arrangements of parts as disclosed on the accompanying drawings, set forth in the following specification, and especially pointed out in the appended claims.

In the drawings heretofore mentioned, Figure 1 is a plan view of the stove; Fig. 2, a front elevation of same with portion broken away; Fig. 3, a horizontal transverse section on lines 3 3 of Figs. 5 and 6; Fig. 4, a like section on lines 4 4; Fig. 5, a vertical section on lines 5 5 of Fig. 1, and Fig. 6 a similar section on line 6 6 of said figure.

Like characters of reference designate corresponding parts throughout the several views.

With reference to the drawings heretofore described and introduced as a part of this specification the reference character A indicates a casing comprising a stove-body and formed of three vertical side walls, as 10 10 and 12, suitably disposed to render the body substantially triangular in horizontal section. As now considered, the walls 10 comprise the back wall and are preferably disposed at right angles to fit the stove to the corner of ordinary rooms and render the front side wall 12 of considerable width. At the base of the body a suitable fire-box A' is formed to receive a grate, as B, and an ash-pan, as C, and suitable doors, as D and E, are hung in any ordinary manner to the front wall at the base to afford access to the grate and pan, respectively.

Above the grate B a plurality of cooking-compartments, as F, are conveniently formed in the stove-body in a tier, with their top and bottom walls extending to the side walls of the body. These compartments are separated to install radiation-chambers, as L, thus interposed between the top and bottom walls of contiguous compartments, and these chambers are connected to suitable vertical flues, as $g$, conveniently brought into communication therewith at opposite sides, so that the entire products of combustion arising from the grate B are caused to pass *en masse* through said radiation-chambers in exit and are thereby passed across the top and bottom walls of the several cooking-compartments.

The vertical flues $g$ are preferably located in the corners of the stove-body, and the lower one thereof opens to the fire-box, and each flue is conveniently provided with a damper, as $h$, adapted to regulate the admission and discharge of the products of combustion to and from the respective radiation-chambers.

Suitable draft-openings, as $k$, are formed, preferably, in the front wall of the stove-body for the admission of additional air to the respective radiation-chambers as determined by the adjustment of suitable doors, as $k'$, hung at the openings, thereby regulating the intensity of heat in the respective chambers.

In the present embodiment each flue $g$ is conveniently formed by erecting a vertical partition, as 15, across one corner of each cooking-compartment and cutting away the portion of the top and bottom walls inclosed thereby, and the dampers $h$ are preferably slidably engaged with the said top walls and conveniently rendered operative from the interiors of the compartments by forming slots, as 9, in said walls and securing pins, as 14, to the dampers, each having projection into a respective compartment through said slots.

A suitable air-chamber, as G, is conveniently formed in one of the side walls of each cooking-compartment and is adapted to prolong by radiation the heat confined in said compartment after the primary source of heating is removed or extinguished. In the present instance these air-chambers are suitably formed in the corners of the body in respective compartments by erecting partitions 16 opposite the flues and are formed in a like manner, omitting the cutting away of the top and bottom walls of the respective compartments.

Above the top one of the cooking-compartments is suitably positioned a top to the stove-body, as a, between which and the top wall of said compartment the products of combustion pass to a suitable pipe, as P, which is preferably placed in the remaining corner of said body and extends thereabove and downward therein through each of the compartments and radiation-chambers, with its lower end closed by the bottom wall of the lower compartment. In this pipe suitable vents, as v, are formed adjacent the top of each cooking-compartment and in communication therewith for escape to the pipe of resultant gases and odors in cooking, and suitable dampers, as 20, of any ordinary construction are conveniently combined with said vents and each rendered operative from the interior of the respective compartment. An aperture, as t, is also cut in said pipe between the top of the upper cooking-compartment and the top a of the stove-body for the final discharge of the products of combustion from said body after their sinuous course about the walls of the several cooking-compartments.

Suitable stove-holes are preferably formed in the top a and ordinary plates supplied therefor, as shown in Figs. 1 and 5, and like holes can be formed in the bottom wall of either or all of the cooking-compartments and supplied with plates in any ordinary and well-known manner, as indicated in Fig. 4.

The front side wall of the stove-body A is conveniently formed to accommodate the hanging of suitable doors, as b, opening into the cooking-compartments, and a soot-door for communication with the space above the upper of said compartments.

The doors b comprise practically the entire front side wall of the cooking-compartments and when opened expose comparatively extensive radiation-surfaces embodied in the top, bottom, and side walls of each compartment and also extensive areas of plate-surface for cooking embodied in the bottom walls thereof and adapted to accommodate a great number of cooking utensils, each of said plate-surfaces being so arranged as to radiate a different degree of heat, according to the relative position thereof to the grate B, the adjustments of the several dampers h, and the doors K', as will be understood from the following description.

Products of combustion escaping from the fire-box containing the grate B pass upwardly through the first flue g and into the first radiation-chamber, in which they expand and pass to the opposite side thereof, when the second flue g leads them to the second radiation-chamber, and so on to final discharge from the stove-body A to the pipe P, as heretofore set forth.

During the passage of the products of combustion through the stove-body each cooking-compartment is heated thereby to a degree relative to its proximity to the grate B, the adjustment of the dampers h, and the doors K', and thereby various degrees of heat are conveniently rendered accessible for cooking, as it will be understood that the degree of heat in either or all cooking-compartments is conveniently regulated by proper adjustment of the dampers h to retain more or less of the products arising from the grate in the respective radiation-chambers and the adjustment of the doors K' to admit or exclude air.

The triangular form of the stove-body renders it especially useful in rooms of limited floor-space, as it can occupy one corner thereof with the front side wall diagonally disposed, thus presenting a comparatively broad field for accommodation of the operator.

Having thus described my invention, what I claim as new, and desire to secure by Letters Patent, is—

1. A portable stove comprising vertical side walls disposed in triangular relation to each other, transverse partitions arranged horizontally therein to form ovens, and extending from side to side of the outer case, and separate vertical plates extending across the angles at the front side of the triangular casing from the front to the back walls, to close in the ovens and form smoke-flues alternately upon opposite sides of the series of ovens, substantially as described.

2. A portable stove comprising vertical side walls disposed in triangular relation to each other, transverse partitions arranged horizontally therein to form ovens, and extending from side to side of the outer case, and separate vertical plates extending across the angles at the front side of the triangular casing from the front to the back walls, to close in the ovens, and to form also smoke-flues and hot-air spaces, the said smoke-flues and hot-air spaces being alternately upon opposite sides of the ovens, substantially as described.

3. A heating apparatus comprising vertical side walls disposed in triangular relation to each other, transverse partitions forming ovens, smoke-flues formed in the angles at the front side of the triangular casing, alternately upon opposite sides of the ovens, closed hot-air spaces also formed in the angles at the front side of the triangular casing on a level with the ovens and on the opposite side of the same from the smoke-flues, and a combined smoke-exit pipe and ventilating-pipe for the ovens arranged in the back angle of the two rear sides of the casing substantially as and for the purpose described.

4. An apparatus of the nature indicated, comprising a body having a top and a fire-box beneath the top, a tier of cooking-compartments in the body intermediate said box and top and having doors, radiation-chambers interposed between the compartments and draft-openings to the chambers, a pipe passing through said tier, having its lower end closed and a vent for each compartment and a smoke-opening above the upper compartment beneath said top, a vertical flue in the wall of the first compartment from the fire-box to sides of contiguous compartments and a damper for each flue.

5. An apparatus of the nature indicated, comprising a casing composed of vertical back side walls disposed at right angles and a diagonal front side wall connected to the outer edges of the back walls, a top therefor and a fire-box at the base, a tier of cooking-compartments between said walls with door-openings through the front wall, radiation-chambers interposed between the compartments and draft-openings to the chambers; a pipe passing through said tier in the back corner having its lower end closed and a vent for each compartment and a smoke-opening above the upper compartment beneath said top, a vertical flue in one front corner of the first compartment leading from the fire-box to the first radiation-chamber and an air-chamber in the opposite corners of contiguous compartments and an air-chamber in the opposite corners and a damper for each flue.

In testimony whereof I affix my signature in presence of two witnesses.

ELEANOR CLARKE.

Witnesses:
JOHN Y. TERRY,
JOHN E. CARROLL.